Oct. 24, 1950  M. A. CHAVANNES  2,527,398
METHOD OF PREPARING SURFACE-DECORATED PLASTIC SHEETS
Original Filed Feb. 28, 1946  4 Sheets-Sheet 1

INVENTOR
MARC A. CHAVANNES
BY H. C. Dieserud
ATTORNEY

Oct. 24, 1950 M. A. CHAVANNES 2,527,398
METHOD OF PREPARING SURFACE-DECORATED PLASTIC SHEETS
Original Filed Feb. 28, 1946 4 Sheets-Sheet 2

INVENTOR
MARC A. CHAVANNES
BY
H. C. Dieserud
ATTORNEY

INVENTOR
MARC A. CHAVANNES
BY
ATTORNEY

Oct. 24, 1950   M. A. CHAVANNES   2,527,398
METHOD OF PREPARING SURFACE-DECORATED PLASTIC SHEETS
Original Filed Feb. 28, 1946   4 Sheets-Sheet 4

INVENTOR
MARC A. CHAVANNES
BY
H. C. Dieserud
ATTORNEY

Patented Oct. 24, 1950

2,527,398

UNITED STATES PATENT OFFICE 2,527,398

METHOD OF PREPARING SURFACE-DECORATED PLASTIC SHEETS

Marc A. Chavannes, New York, N. Y., assignor to Chavannes Industrial Synthetics, Inc., New York, N. Y., a corporation of Delaware Original application February 28, 1946, Serial No. 651,028. Divided and this application July 26, 1950, Serial No. 175,936

4 Claims. (Cl. 18—47.5)

The present application is a division of application Serial No. 651,028, filed February 28, 1946.

This invention relates to a process for producing various jacket-like articles and the like.

It is especially applicable to the production of such articles as bags, raincoats, tobacco pouches, gloves, tubes, envelopes, baby pants, life belts, pillow cases and the like of flexible film-like material, such as plastic or rubber film. The expression "jacket-like article" as used herein will be understood to mean an article comprising at least two sheets of flexible material superposed at least in part, united in at least one area, but separable in at least one area, and the term will cover, among other articles, those listed above.

There have in the past been many attempts to develop inexpensive processes for manufacturing such articles. One common process is first to form flexible sheeting or film of, for example, plastic or rubber composition, and then to cut or stamp from this sheeting blanks in the shape of the desired article. These blanks are then arranged in matching pairs and joined at the edges by a seaming or sealing operation. If the blanks comprise thermoplastic material, a heat sealing method may be used to join the pairs of these blanks around the edges. Sometimes a thermoplastic or other type adhesive is used to seal the edges. In other cases, a sewing operation is used and the seams are covered with a waterproof adhesive band or tape.

Even though methods may be used whereby a large number of pairs of blanks can be sealed at a time, and even though special steps are taken to make it possible to seal curved or irregular edges, any type of seaming or sealing operation requires considerable time and effort and is relatively expensive. In fact, the cost of this step is very often greater than the cost of the film or sheet material itself. A further disadvantage is that articles so manufactured are usually structurally weak in the region of the seams or seals.

An object of the present invention is to eliminate all or most of these seaming or sealing operations by a method which effects the junction between the two films during the process of forming the films.

An advantageous feature of the invention is that in articles produced in accordance with its teachings, the junctions which replace ordinary seals or seams are actually integral junctions of the sheet or film material, free from the structural weakness usually found at seams or seals. A further feature is that such articles can be manufactured, even if of intricate shape, with greater speed and economy by the proposed method than by previous methods.

In jacket-like articles produced from film by various previous methods, the seals or junctions are usually found to be extremely irregular when closely examined, and an advantageous feature of the present invention is that its teachings make it possible to produce junctions which are quite uniform in dimensions and characteristics.

Another object of the invention is to produce jacket-like articles with a decorative and useful undulated finish.

Another object of the present invention is to produce jacket-like articles of plastic or rubber film, reinforced or decorated with fabric. Such an article may, for example, comprise an integral inner lining of film-like material having a Y-like integral junction with a projecting fin, and an outer covering of fabric, paper, metal or other reinforcing material which may be stitched through the fin of the inner lining.

A further object is to produce on a moving carrier a film of approximately twice the width of the carrier, comprising two superposable sheets of film, each approximately the width of the carrier, the sheets being integrally united one to the other along only one longitudinal edge, so as to be capable of being opened up into a film of double width.

Further objects, features and advantages will appear from the more detailed description set forth below by way of illustration, which will now be given in conjunction with the accompanying drawings in which.

The general steps will now be briefly given of a process illustrating in part the teachings of the present invention, as applied to the production of an article comprising, for example, film made from an organosol of vinyl resin. The invention will subsequently be described in more detail.

A film is initially cast as a layer of organosol on a carrier and this film is dried but not fused. Then on this first or bottom film there is printed a design, which is to be an interlayer, in the shape of the desired article, of a substance which adheres but lightly to the film. This design will be smaller than the desired article by a narrow peripheral margin. Then a second or top film, like the first one, is cast over the first layer and interlayer. The top film will form an integral junction with the bottom film in the regions where the interlayer does not exist, but will be prevented from firmly adhering to the bottom layer in the region of the interlayer. The carrier, bearing the layers of film, is then passed through a drying and fusing oven. The entire film is then stripped from the carrier and is passed through a set of cutting rollers, where the article is cut from the film in such a manner as to cut outside the contours of the nonadhesive interlayer, and since the top film forms a perfect bond with the bottom film where they contact each other, the finished article will have an integral junction around the edges, as desired. Because of the action of the interlayer mentioned, the top and bottom layers will not adhere to each other in regions where their separation is desired. Openings can, during the cutting step or later, be cut in the article where desired, as at the top or open end of a bag, for example.

The invention may be described in more detail as follows:

The bottom and top layers of film, which comprise the main body of the manufactured article, may be made from a wide variety of substances, and the non-adhesive interlayer may be also of a variety of substances which will cause the other layers not to adhere one to the other.

For example, the main body of the article may be formed from latex, especially of the prevulcanized type, natural rubber in solution, or synthetic rubber such as Buna rubber, Perbunan or butyl rubber, or the like. In case the main body is formed from such rubber-like substances, the interlayer may comprise a film-forming substance of the vinyl resin type, such as plasticized vinyl acetate-chloride copolymer, polyvinyl alcohol, or of the alkyd resin type, or of cellulose nitrate, or the like.

It is frequently satisfactory to reverse the arrangements; that is, substances which may satisfactorily serve as an interlayer in one case may in another case be used to comprise the main body of the article, and correspondingly, substances which could serve as the main body of the article could be used as the interlayer. Also, there are other quite satisfactory combinations of substances; for example, one of the most satisfactory combinations is to use for the main body of the article a film made from a dispersion or organosol of vinyl acetate-chloride copolymer, and to use as an interlayer a solution of polyvinyl butyral in butanol, each of which was listed above as a possible interlayer for a bag-like article of rubber-like material.

Some film-forming substances, such as prevulcanized latex, are characteristically non-heat sealable, or incapable of being heat sealed. Others may be termed non-integrally-heat sealable; that is, if two sheets of such material are superposed and subjected to heat and pressure, they will not form an integral bond. If a junction of the sheets is formed, it will be structurally weak and the sheets may be pulled apart at the junction. Such non-integrally-heat-sealable substances include vinylidene chloride, copolymers of polyvinyl chloride and vinylidene chloride, and copolymers of vinyl acetate and vinyl chloride with molecular weights over 100,000 units. The present invention is especially applicable for producing jacket-like articles the main body of which comprises non-heat-sealable or non-integrally-heat-sealable material.

The present invention is not restricted to the substances listed, but may be used in connection with any combination of substances provided the interlayer will prevent the other two layers from firmly adhering one to the other.

For the purpose of the present detailed illustration it may conveniently be assumed that the articles are to be made of a film cast from an organosol or dispersion comprising a vinyl acetate-chloride copolymer, and that the interlayer will be formed from a solution of polyvinyl butyral in butanol. Methods for preparing such organosols are well known in the art, and various formulas may be used. An illustrative formula for organosol may comprise a vinyl acetate-chloride copolymer, a plasticizer, a high boiling diluent and a low boiling diluent. The vinyl acetate-chloride copolymer may conveniently be the product of Carbide and Carbon Chemical Corporation known by the trade name VYNV-1, or a similar product. Dioctyl phthalate is a satisfactory plasticizing agent. Xylol may satisfactorily be used as a high boiling diluent. Instead of Xylol there may be used a treated petroleum solvent comprising approximately 80% aromatics and 20% aliphatics, having a boiling range approximately as follows: 5%, 138° C.; 95%, 168° C. An example of such a solvent is a solvent presently sold by Standard Oil Company of New Jersey under the trade-mark "Solvesso." As a lower boiling diluent, there may be used a petroleum distillate having an aromatic content of approximately 9½% and having a boiling range approximately as follows: 5%, 123° C.; 95%, 165° C. An example of such a diluent is the solvent presently sold by the Anderson-Pritchard Oil Company under the trade-mark "Apco" thinner. These substances have been successfully combined in the following ratio

| | Parts by weight |
|---|---|
| Vinyl acetate-chloride copolymer | 1000 |
| Dioctyl phthalate | 500 |
| Xylol or "Solvesso" | 200 |
| "Apco" | 490 |

In a manner well known in the art, to prepare an organosol of the above substances, the various components are milled together in a ball or pebble mill for a considerable length of time and at a controlled temperature. The time of grinding and the optimum temperature will be determined by the nature and ratio of the components. As an example, grinding for about 24 hours may be necessary, and for some mixtures the temperature should be about 100° F. The ratio of plasticizer to resin should be greater than 0.15 to 1, preferably greater than 0.25 to 1, and less than 1.1 to 1.0.

In the following example it may be assumed that the purpose is to produce a raincoat, but it will be understood that the same process and apparatus could be applied but with slight modification to produce a variety of articles.

Figure 1:
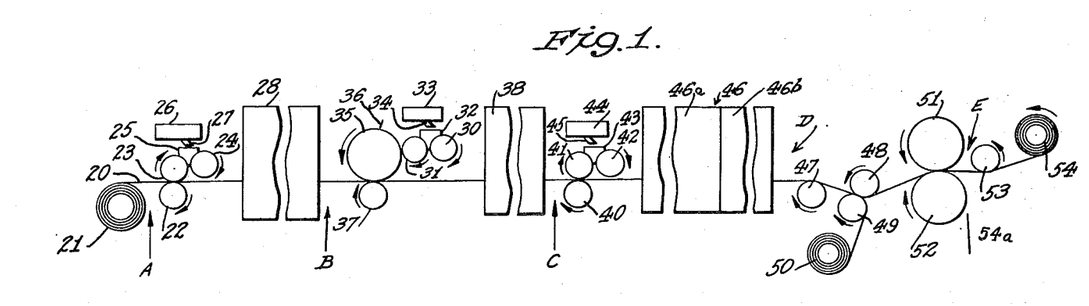
Fig. 1 is a schematic view in side elevation of apparatus for producing jacket-like articles, such as raincoats, of resinous film.

Reference is now made to Fig. 1. The apparatus makes use of a continuously advancing carrier 20. This carrier may be formed of strong, relatively heavy paper having applied to one, or both, of its surfaces a firmly adhering coating of a base material, such as polyvinyl alcohol, casein or the like, capable of providing a smooth outer surface on the carrier to which the film-forming coating will but lightly adhere. The paper or other supporting material may be in the form of a web, that is, being supplied from one roll and wound up on another roll after being used. Alternatively, it could be in the form of a continuous belt, or in sheet form. In the illustration which is to follow, it will be assumed to be in the form of a web. The character of the base coating preferably applied to the carrier web will vary with the character of the film to be produced. For instance, a plasticized casein coating has been found well suited for the purpose of a carrier on which a film comprising a copolymer of vinyl acetate and vinyl chloride, is to be formed. Such a base coating may also be used for the production of films of other types of synthetic or natural resins. A polyvinyl alcohol coating may also be used in the formation of most resinous films but such coating should preferably be heavily filled. In the production of films from other plastic substances, the base coating on the surface of the web should be such as not to react with any solvent used in the film-forming substances and not to be affected by the temperature and other conditions employed in the process. Moreover, it should be flexible, so as not to crack in normal handling or in its passage through the coater and dryer, and such that the final film may be readily stripped from it. Various thermosetting resins provide suitable base coatings for a large number of different types of films. The web itself, in lieu of being formed of paper, may be formed of other relatively inexpensive, flexible material capable of withstanding the strains and conditions to which it is subjected in the conduct of the process. It may, for example, be formed of a cellulose derivative or of asbestos paper, metal foil, a metal band, fiber glass, or the like.

In case it is desired to use a continuous belt, one preferred embodiment is a strong paper, preferably of the jute or rope type, of a basis weight of 125 pounds or over. This paper may be coated with a base material comprising three parts of an alkyd to one part melamine, by weight. The alkyd may be the product of American Cyanamid Company known as "Resil," or a similar product, and the melamine may be the product of the same company known by the trade name "Melamac," or a similar product. The paper is preferably treated with this base coating at the time of its manufacture. Belts made in this manner may be used many times, such as from 100 to 300 times.

It is assumed that prior to the present process the carrier web has been prepared with its permanently adhering coating. Reference is now made to Fig. 1. As shown the permanently-coated carrier 20 may be carried by a reel 21. It is drawn from this reel by a rubber-coated roller 22 pressed against the lower surface of the carrier. This roller rotates in a clockwise direction in the illustrated arrangement so as to urge the carrier toward the right in Fig. 1. Cooperating with this roller is a roller 23 pressed against the upper surface of the carrier at its line of tangency with roller 22. Roller 23 has a smooth, preferably metallic, surface. As indicated, roller 23 rotates in a clockwise direction so as to oppose the motion of the carrier, but since roller 22 has a rubber surface and roller 23 a smooth, metallic surface, roller 22 grips the carrier and advances it to the right, while the surface of roller 23 is merely wiped across the surface of the carrier.

A roller 24 cooperates with roller 23 and is adjacent but not tangent thereto, nor is it tangent to the carrier. As indicated, roller 24 rotates in a clockwise direction. A trough 25, partly formed by rollers 23 and 24, together with means not shown for damming up the ends of the trough, is provided for holding previously-milled organosol such as that mentioned above, and applying the same to roller 23. An even coating of organosol is thus applied to roller 23 and is smeared by this roller onto the moving carrier 20 which, as stated, has previously been provided with the smooth permanent coating of base material. The organosol may be supplied to trough 25 continuously from any suitable source, such as a mixing vat 26, through a pipe 27.

It is of course to be understood that the coating apparatus may take a wide variety of forms and may incorporate refinements not shown in Fig. 1, but which are well known in the art. Instead of using roller coating means, the apparatus could accomplish coating by means of spreaders, sprayers, hoppers or other means.

Means are provided for leaving an uncoated margin along the edge of the carrier to facilitate stripping the film at a later stage in the process. This may be accomplished by using a carrier which is wider than the effective width of the coating rollers.

After receiving the first uniform organosol layer, the carrier is then passed through a drying oven 28. This oven is maintained at a temperature high enough to cause the diluent to be driven out of the organosol.

Figure 2:
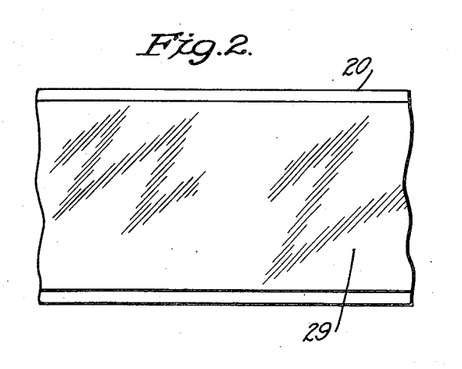
Fig. 2 is a plan view of a first layer of film on a carrier, such as would appear in region B of Fig. 1.

Fig. 2 is a plan view representing the carrier 20 bearing a first layer 29 of dried organosol or film as same would appear in region B of Fig. 1 as it leaves the first drying oven.

Reference is again made to Fig. 1. The carrier with its first layer of dried organosol or film is now passed through a set of rollers of the rotogravure type. The purpose of these rollers is to print on the first layer of film a design in the shape of the desired article, but slightly smaller than same. The substance with which this design is printed may be one which has little or no adhesive affinity for the first layer of film when dried. If the top layer of film which is to be applied over the design is of the same substance as the first layer of film, then the design would likewise not be adhesive to the top layer of film when this layer is dried. If the first and top layers are of different substances, it is possible to use a substance for the design or interlayer which will adhere to either the top or the bottom layer, or it could be satisfactory for the design to adhere partly to each layer. Thus the interlayer might satisfactorily have an adhesive affinity for each layer but be weak in tensile strength, so that it does not bind the two layers together. The interlayer need not be perfectly continuous; thus it is possible that the top and bottom layers may form a few bonds or "legs" extending through the interlayer, which could be easily broken, allowing the films to be separated. The important characteristic of the design or interlayer is that it prevent the top and bottom layers from firmly adhering or integrally uniting one with the other in the area of the design.

In the present example, as stated, it is assumed that the design or interlayer is formed from a solution of polyvinyl butyral in butanol.

The polyvinyl butyral may satisfactorily comprise 5 to 10 per cent by weight of the solution, but other ratios may be used.

In the arrangement shown in Fig. 1 for applying the design, a smooth metallic roller 30 cooperates with and is adjacent but not tangent to a similar roller 31 on the left of said roller 30. These two rollers are located above the carrier 20 and are not in contact with it. As shown, they both rotate clockwise; however, the speed and direction of rotation of roller 30 is adjustable. As in the case of the first-mentioned set of coating rollers, a trough 32, partly formed by rollers 30 and 31, together with means not shown for damming up the ends of the trough, is provided for holding the non-adhesive substance. This substance may be supplied to trough 32 continuously from any suitable source, such as a mixing vat 33, through a pipe 34. An even coating of non-adhesive substance is supplied from trough 32 to roller 31. An engraved metallic roller 35, in this illustration, is located on the left of roller 31, and cooperates with same. Roller 35 rotates counterclockwise. This roller 35 is engraved with a pattern corresponding to the desired article, as partly shown in Fig. 3, an enlarged plan view of said roller. In the present case the design is that of a raincoat.

Figure 3:
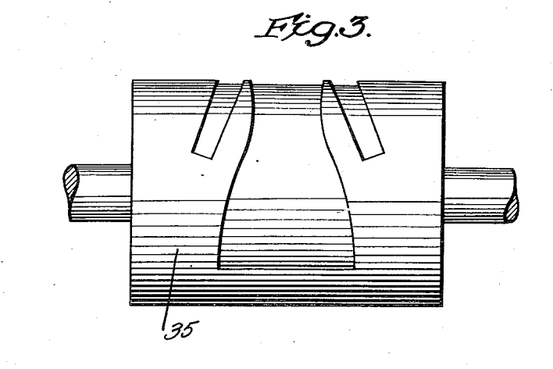
Fig. 3 is a plan view of one of the rollers shown in Fig. 1.

Rollers 31 and 35 are located adjacent to each other, their surfaces being separated only by a layer of non-adhesive substance, and as a result of their cooperation, a layer of non-adhesive substance is applied to the engraved roller 35 by the roller 31. A doctor blade 36 is provided for scraping the non-adhesive substance from the surface of roller 35 in all regions except in the engraved portion.

The surface of roller 35 is in contact with the upper surface of the carrier. A rubber-coated roller 37 is located beneath the carrier and in contact with same, under roller 35. Roller 37 rotates clockwise and grips the carrier so as to advance same toward the right as shown in Fig. 1. The non-adhesive substance in the engraved portion of roller 35 is thus transferred to the upper surface of the first layer of film on the carrier, and hence the desired design is printed on the carrier.

The coated carrier is then passed through another drying oven 38, similar to oven 28.

Figure 4:
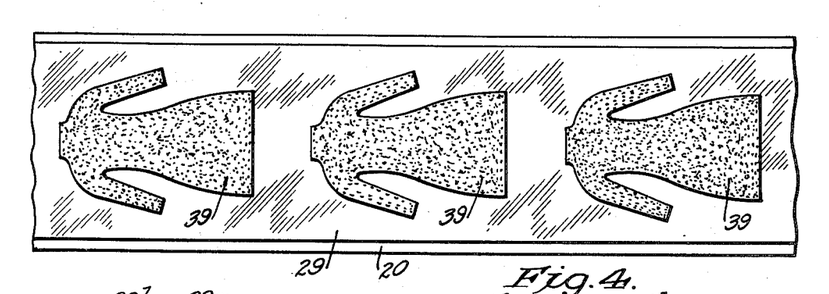
Fig. 4 is a plan view showing the first layer of film on the carrier, with a design of a relatively non-adhesive substance printed on said film, as same would appear in region C of Fig. 1.

Fig. 4 is a plan view of the carrier 20 bearing the first coating 29 of film and a design 39 printed thereon of non-adhesive substance in the shape of a series of raincoats, as same emerges from drying oven 38 in region C of Fig. 1.

The coated carrier is now passed through another set of coating rollers, 40, 41 and 42, similar to rollers 22, 23 and 24, respectively. This set of rollers is supplied with organosol of the type used with the first set, by means of trough 43, mixing tank 44, and pipe 45, the operation of which is similar to the coating means used in forming the first layer of organosol.

A coating of organosol is thus applied to the exposed portion of the first film and to the design. When dried, this top coating or film will be integrally united with the first film except in the regions where the non-adhesive design or interlayer exists.

The coated carrier is then passed through an oven 46 with drying and fusing sections 46a and 46b, the operation of which is well known in the art of making films from dispersions or organosols.

Figure 5:
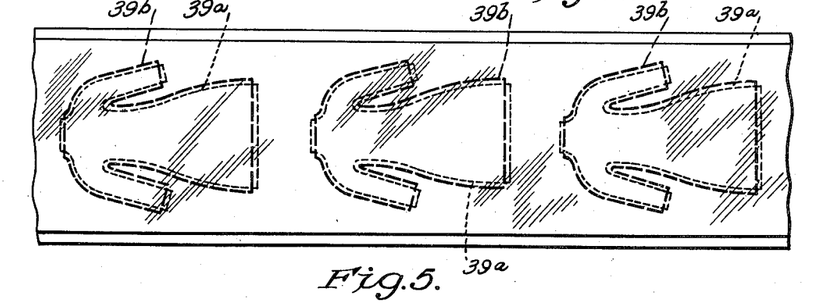
Fig. 5 is a plan view showing the carrier and its various coatings as same would appear in region D of Fig. 1.

The appearance of the coated carrier in region D of Fig. 1 when it emerges from the drying and fusing oven is shown in Fig. 5, a plan view.

The dotted line 39a represents the outline of the interlayer of non-adhesive substance. The dashed line 39b represents a line just outside the periphery of the interlayer, along which, in a manner to be described, the film will eventually be cut, leaving a margin between lines 39a and 39b wherein the films are integrally united.

The carrier bearing the film is then passed over a tensioning roller 47 and through a set of cooperating rollers 48 and 49. The film is stripped from the carrier as it emerges from rollers 48 and 49, which serve as part of the tensioning system and also part of the stripping system. The initial stripping may be done by hand, and the carrier may be attached to and wound upon a reel 50. The stripped film is passed through a set of cutting rollers 51 and 52. These rollers cut the film along the outer line 39b shown in Fig. 5.

The raincoats will thus be removed from the film and may be carried on the surface of roller 52, falling or being removed from same. The appearance of the remaining film, as at region E, is shown in plan view in Fig. 6. This film is then passed under a tensioning roller 53 and is wound upon a reel 54, as shown in Fig. 1. A raincoat 54a is shown falling from roller 52.

It is observed in Fig. 5 that the line 39b, along which the film is cut, may actually traverse the non-adhesive layer in regions where the raincoat has openings, such as at the lower or open ends of the sleeves, at the bottom of the coat and at the collar. In order to provide the front opening, the upper film only will, in a separate operation, be cut up the front. The appearance of the complete raincoat is shown in a perspective view in Fig. 7. If desired, the entire garment may be turned inside out in order that the junction may be on the inside instead of on the outside.

Obviously, if cutting means such as the cutting rollers 51 and 52 are used, great care must be taken to insure that the cutting rollers properly register with the design. Instead of using cutting rollers, a die-stamping device could be used, in which case provision would have to be made to prevent relative motion between the film and the cutting die during the stamping. In order that the die might cut at the right point, the film might be provided with a mark, hole, or other irregularity which would actuate the die by photoelectric, pneumatic, mechanical, or other means.

Many other means of cutting out the garment may be used. For example, the film, after being stripped, could be cut into sections and then the various sections lined up so that the garments register one with the other, and a large number of garments could be cut out by knives or other means.

Figs. 8 through 11 show the steps in producing an integral junction of two layers of film. All of these figures are sectional views through the carrier and various layers. In these figures there is considerable distortion of the relative thicknesses of the component layers. In particular, the interlayer of non-adhesive material is shown to be considerably thicker than it actually is in relation to the other components. For simplicity, the carrier is shown as a whole, with no dividing line between the web or belt itself and its permanently-adhering coating of base material.

Figure 8:
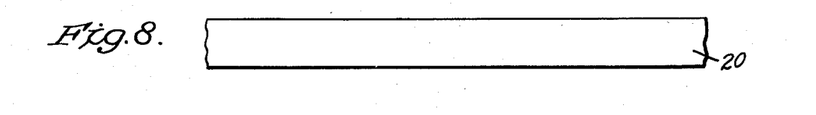
Fig. 8 is a sectional view showing an uncoated carrier.

The uncoated carrier 20, as in region A of Fig. 1, is shown in Fig. 8.

Figure 9:
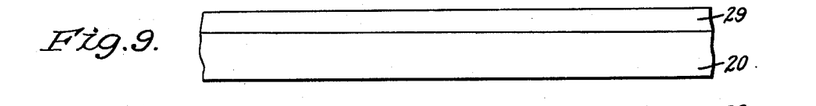
Fig. 9 is a sectional view showing a carrier bearing a first layer of film.

The carrier 20, bearing the previously-mentioned first layer of film 29, as in region B of Fig. 1, is shown in Fig. 9.

Figure 10:
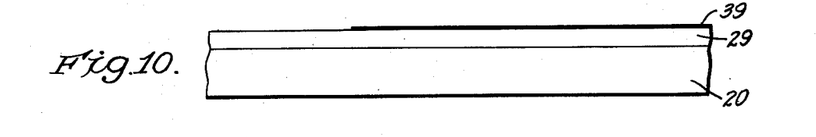
Fig. 10 is a sectional view showing a carrier bearing a first layer of film and a layer of non-adhesive substance.

In Fig. 10 there is shown the carrier 20 bearing its first coat of film 29 and the layer of non-adhesive substance 39.

Figure 11:
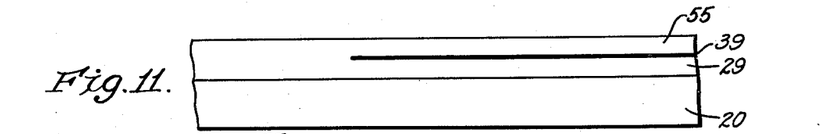
Fig. 11 is a sectional view showing a carrier bearing a first layer of film, an interlayer of non-adhesive substance, and a second layer of film.

In Fig. 11 is shown the carrier 20 bearing its first film 29, the layer of non-adhesive substance 39, and the second layer of film thereon, as same would appear in region D of Fig. 1. This second layer of film may be designated by the numeral 55.

Figure 12:
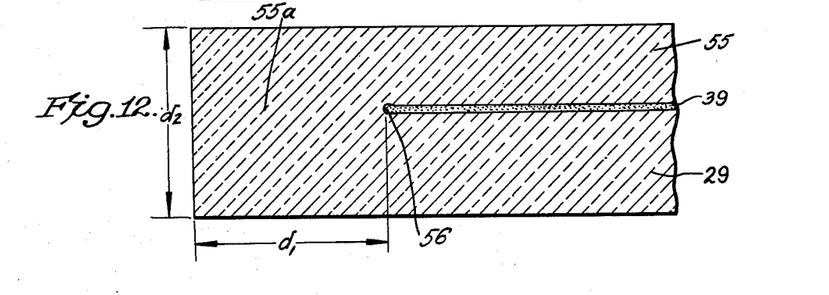
Fig. 12 is a sectional view on a larger scale showing the integral junction at the edge of a completed article.

Fig. 12 represents an enlarged section through an edge of the raincoat or other article after it has been stripped from the carrier and cut along the dashed line 39b indicated in Fig. 5, outside the periphery of the interlayer. It is to be noted that layers 29 and 55 form a junction which is completely integral and continuous, and that the junction has a projecting fin 55a.

The shape of the junction could also be described as generally Y-like, the top and bottom films comprising the arms of the Y, and the fin-like portion 55a comprising the base of the Y.

It would of course be possible by the teachings of the present invention to produce junctions which are not at the edge of the article, in which case a cross section through the junction might be in the form of a double Y, or a base with a pair of arms at either end.

As shown in Fig. 12, the top and bottom films may be of unequal thickness, or they may be of equal thickness.

It is also possible to use different film-forming substances for the top and bottom layers, provided they are mutually adhesive.

The top and bottom films may in some embodiments be generally parallel near the junction, or they may flare apart as they leave the fin.

The inner or adjacent surfaces of the films converge or are brought together in a fillet-like region, and the farthest extension of this region into the fin as shown in the cross sectional view of Fig. 12 is designated by the numeral 56 and may be called the innermost junction of the arms of the Y.

The shape of the fillet-like region results from the shape of the edge or boundary of the interlayer of non-adhesive substance. Because of surface tension of the interlayer, its edge is not knife-like, and is not square in cross section, but is somewhat rounded. The rounded region is asymmetric about a mid-plane of the interlayer. This is true because the interlayer rests on a first layer of dried, unyielding film, while the top layer has not yet been applied and hence the interlayer is free to bulge outward and upward at the edge as its surface tension tends to draw it into a spherical shape.

The process and product of the present invention are quite different from other processes and products in this general field. One of the ways the product differs from heat-sealing processes, for example, is in the integrality of the junction which may be formed with the present process. As previously mentioned, there are a number of substances which are completely non-heat-sealable, and other substances which are non-integrally heat-sealable, but if instead of heat-sealing methods, the process of the present invention is used, articles having completely integral junctions can be formed from a number of these substances. An integral junction produced by the teachings of the present invention has great strength; if the component films are put under tension one with respect to the other, the Y-like junction will not split lengthwise down the base of the Y. That is, the films will not separate along a plane between them extending longitudinally into the fin.

The depth of the fin may be defined as the dimension $d_1$ shown in Fig. 12. Since junctions may be under unusual stress and may be subject to considerable wear, the depth of the fin in order to provide a reinforcing effect should be greater than the thickness of one of the films, and if desired, a number of times greater than same. Thus if the junction is considered Y-like in cross section, the fin-like portion comprising the base of the Y should project from the point 56, the innermost junction of the arms of the Y, by a distance greater than the thickness of one of the films.

The thickness of the fin may be defined as the dimension $d_2$ in Fig. 12. It is to be observed in this illustration that this thickness is uniform throughout the fin. While in certain modifications of the present invention to be described at a later point there may be small variations in the thickness of the fin toward its extreme edge it is generally preferable that the fin be of uniform thickness for a depth from point 56 greater than the thickness of one of the films. The nature of the coating system used in applying the upper coating of organosol is such that the upper surface of this coating is smooth and does not conform to any irregularities such as those represented by the presence of the interlayer in some regions and its absence in others. Although toward the extreme edge of the layers of organosol there may be surface tension effects which produce slight variations in thickness, these regions do not fall within the fin at all when articles are produced by the method described above. That is, these areas are part of the trimmed-away film shown in Fig. 6. As shown in Fig. 12, therefore, the fin may have generally straight and parallel upper and lower boundaries and a generally straight boundary at the outer edge, generally perpendicular to the upper and lower boundaries, thereby providing two corners which are nearly square as viewed in cross section.

The magnitude of the thickness dimension $d_2$ of the fin is observed to be the sum of the thicknesses of the upper and lower films, plus the thickness of the interlayer. If the interlayer is very thin, which it may be, the thickness of the fin will be just slightly greater than the sum of the thicknesses of the component films. Thus the interlayer may be less than one ten-thousandth of an inch in thickness, or may even be only a few molecules thick.

Because of various practical difficulties, the thickness of the interlayer should ordinarily be less than 20 mils.

Consequently, the thickness of the fin should be slightly greater than the sum of the thicknesses of the films, but not more than 20 mils greater than same, throughout a depth measured from point 56 greater than the thickness of one of the films.

It is also to be observed that the interlayer used in the present process may if desired be quite fragile, or non-self-supportable, since it is at all times during the manufacturing process supported by the first film, at all points. Furthermore, since the interlayer is supported in this manner, it is possible to produce a completely enclosed envelope-like structure, free from any openings for external supports for an interlayer.

The ultimate disposition of the interlayer may be handled in different ways. One possible method is to use an interlayer more elastic than the top and bottom films. In this case the interlayer may permanently adhere to either or both of the films. This embodiment is illustrated in the example given above, wherein polyvinyl butyral is used as an interlayer and the films comprise a copolymer of vinyl acetate and vinyl chloride. In this case, it is possible to separate the top and bottom films, and to allow the interlayer to remain on the surface of one or both films.

Another method of disposing of the interlayer is to make it from a substance which can be dissolved without injury to the films. Thus if the interlayer is of polyvinyl alcohol, it can readily be dissolved in water. Regardless of the disposition which is to be made of the interlayer, the substance from which it is made, and the composition of the top and bottom films should be so chosen that during the process of manufacture the solvent of the interlayer will not attack the first layer, and no diluent in the top layer of organosol will attack the interlayer.

Another way of disposing of the interlayer is to make it of very strong material which may be physically removed, as by peeling the top and bottom layers of film away therefrom. In this method, for example, the top and bottom films may be made from layers of organosol of 1 to 40 mils in thickness, and the interlayer may be of polyvinyl alcohol or polyvinyl butyral, the thickness of which is $\frac{1}{10}$ mil or greater.

It is also possible to use an interlayer which will flake off, or which may be readily brushed away or removed by other means.

Some interlayers which may satisfactorily be used may have an adhesive affinity for some substances but little or none relative to the top or bottom films. That is, they may be relatively non-adhesive to one of these films.

Instead of using only one interlayer, it is also possible to use multiple interlayers. Thus a first interlayer could be used which is adhesive to the first or bottom film, and a second interlayer could be superposed thereon which is not adhesive to the first interlayer but is adhesive to the second or top film.

When the article is completed, the top and bottom layers may be separated in the separable region by various means; for example, some type of suction might be applied to opposite sides in order to pull them apart. Similarly, they could be temporarily engaged by some apparatus elements to which adhesive has been applied, and thus pulled apart. Still another method, especially applicable for bag-like articles, is to insert a needle-like element between the walls and blow air into the cavity, thereby separating the walls.

Figure 13:
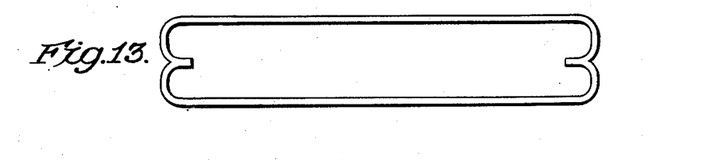
Fig. 13 is a cross-sectional view of a raincoat sleeve or of a tube-like article, turned inside out so that the fin-like projection at the junction will be on the inside.

The article of the present invention can be used with the fin on the outside or the entire article may be turned inside-out in order that the fin may be on the inside. Fig. 13 shows in cross-section the appearance of a raincoat sleeve, for example, which has been reversed in this manner.

Figures 6, 7:
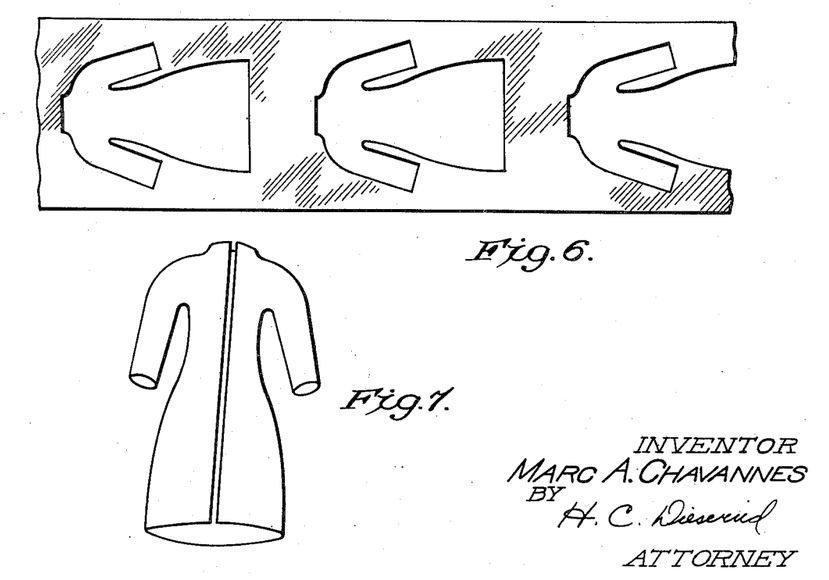
Fig. 6 is a plan view showing the film after having been stripped from the carrier and after having had the articles, such as raincoats, stamped or cut out, as same would appear in region E of Fig. 1.
Fig. 7 is a perspective view of an individual raincoat after the front opening has been cut.
Figure 14:
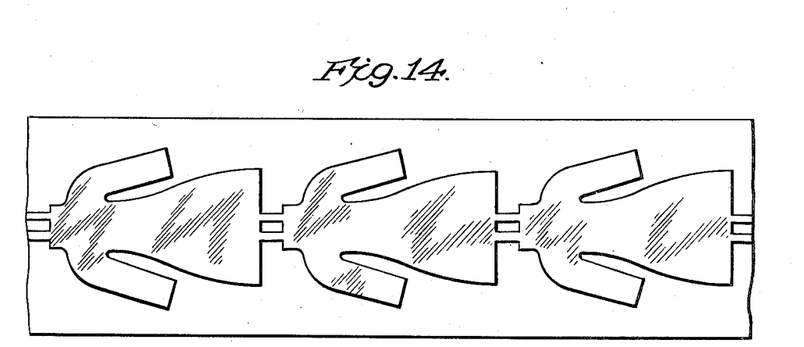
Fig. 14 is a plan view showing the carrier bearing a design of film in the shape of a series of raincoats connected by tabs of film.
Figure 15:
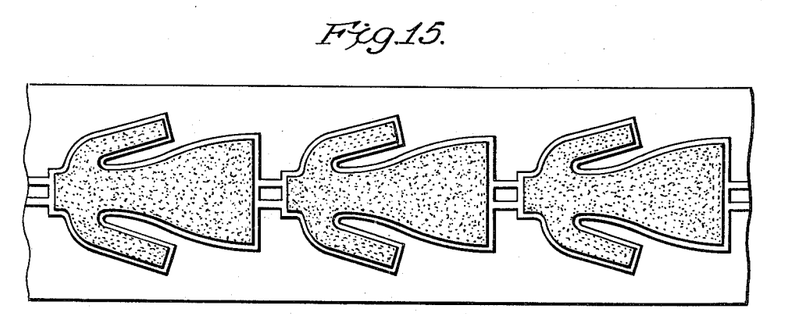
Fig. 15 is a plan view of the articles shown in Fig. 14, after having had a design of non-adhesive substance applied to the raincoats so as to leave an exposed margin thereof.

In order to avoid wasting material, such as that shown in Fig. 6, the present invention may be modified in the following manner. Instead of casting a continuous first layer of organosol, there is provided on the carrier a first design of organosol the size and shape of the finished garment. This may be accomplished by substituting for rollers 22, 23 and 24 a set of rotogravure rollers perhaps similar to the set 30, 31, 35, and 37. Fig. 14 shows the appearance of the carrier bearing this design. It is observed that the design is such that there are tabs or links of organosol between the various garments, to be used in stripping. The carrier is then passed through a drying oven such as 28, and there is then printed thereon a non-adhesive design in the shape of the garment, but slightly smaller than same. Care is taken to make certain that this second design registers properly with the first design, leaving a margin around the outer edge, as shown in Fig. 15. If desired, openings in the garment, such as at the cuff-ends of raincoat sleeves, may be provided by running the interlayer design out to the edge of the first film in certain regions. The coated carrier is passed through a drying oven after receiving the layer of non-adhesive substance, and there is printed thereon a design of organosol which registers with the first. The coated carrier is then passed through a drying and fusing oven, and the articles are stripped from the carrier, the tabs or links causing one garment to help strip the next one. Openings may then be cut in the articles if not already provided for, and the tabs may be cut away. In some cases the tabs may be left on the garments until they are shipped to some remote point, where they may be later removed.

The extreme edge of the fin-like junction formed by this last-described process will be affected in shape by the surface tension of the organosol. Thus the upper outer corner of the fin will be rounded and hence the fin will not be of exactly uniform thickness all the way to its extreme outer edge. In spite of this small effect at the edge, the fin should be of uniform thickness for a depth greater than the thickness of one of the films, as measured from the innermost junction of the Y. That is, the irregularity occurs beyond this uniform region.

Throughout most of the fin made by the last-described process, the magnitude of its thickness is equal to the sum of the thicknesses of the two films plus the thickness of the interlayer, as was true in the case of the first-described process.

Another modification of the present invention may be used in case it is desired to produce a bag-like article with a decorative and useful undulated finish. In this case, a film undulated on one side is first prepared by means described in pending application Serial No. 635,982. This film is then temporarily applied to a carrier, undulated side down, with an adhesive. There is then printed on the smooth side of the film a design of non-adhesive material, as described previously in the present application, and this design is then dried. A continuous layer of organosol is then cast over this first film and design, and this layer is given an undulated finish by the same means as was the first layer. The carrier and its various layers are dried and fused, and the film stripped from the carrier. The articles may then be cut out as described previously in this application, leaving a sealed margin around the edges, as desired. The completed article will thus have an undulated finish on its outside. A similar bag-like article, undulated on only one side of its exterior, may be produced more easily if the first layer is not undulated and is not stripped from the carrier. Swelling agent will then be applied only to the top layer of organosol.

Figure 16:
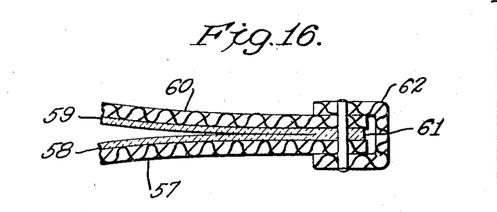
Fig. 16 is an enlarged sectional view showing the edge of an article comprising an inner lining of film which has at the edge an integral fin-like junction, and an outer covering of fabric, together with a reinforcing tape, stitched through the fin-like portion of the junction.
Figure 17:
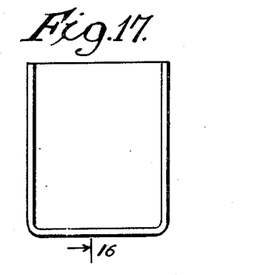
Fig. 17 is a plan view of the article shown in Fig. 16.

Fig. 16 is a cross-sectional view of an edge of a very useful article, shown in plan view in Fig. 17, which may be produced by the teachings of the present invention. The entire article may, for example, be a water-proof bag of great strength. It may comprise an inner lining of film having fin-like junctions of the type previously described and an outer reinforcing covering of fabric, paper, metallic foil, or other reinforcing flexible sheet-like material.

To produce such an article, a layer of fabric 57 may first be laid down on a supporting surface or moving carrier, or if desired, this fabric may itself be the carrier. A layer of organosol or other film-forming material may then be applied to this fabric layer and dried. This layer will form a film 58. A layer of relatively non-adhesive substance may then be printed on film 58, leaving an exposed marginal area, in the manner previously described. This last-mentioned layer may then be dried. This layer is not shown in Fig. 16, because it is there assumed to have been removed. Another layer of film-forming material may then be applied to the exposed area of film 58 and to the layer of relatively non-adhesive material. Before drying this upper layer of film-forming material, a layer of fabric may be laid into or onto it. This upper layer of film-forming material may then be dried, forming a film 59, and the article may be fused. The upper layer of fabric, which may be designated by the numeral 60, will become bonded to film 59, and layer 57 of fabric will become bonded to film 58. Films 58 and 59 will unite in a fin-like portion, 61. If desired, the article may be left in this manner, the outer layers of fabric serving as decorative and reinforcing coverings.

If desired, in order to improve the strength of the article, layers 57 and 60 may be stitched or otherwise fastened through the fin-like portion 61 of the junction of films 58 and 59. Since the stitching does not puncture the films or walls themselves, the article will have at the junctions waterproof or airtight properties as good as those possessed by the film. For still further strength and decorative properties, instead of stitching layers 57 and 60 directly through the fin, a tape 62 may be lapped around the edge and stitched through layers 57, 60 and the fin 61. Other similar arrangements are likewise possible.

The present invention may satisfactorily be used in making articles from unvulcanized rubber. The articles may be made and junctions therein formed very rapidly by the present process, and then the entire article may be vulcanized. A considerable saving in time is effected over older processes wherein vulcanization under pressure for a relatively long time was necessary.

Figure 18:
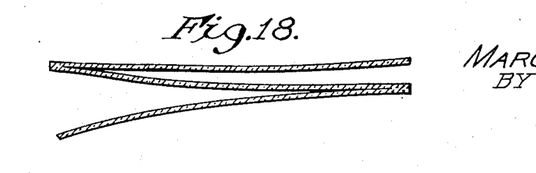
Fig. 18 is a cross-sectional view of an article comprising a plurality of superposable sheets of film integrally united along alternate longitudinal edges, capable of being opened up into a film the effective width of which is greater than that of the individual sheets.

As previously stated, one of the objects of the invention is to produce on a moving carrier a film of approximately twice the width of the carrier, comprising two superposable sheets of film, each approximately the width of the carrier, the sheets being integrally united one to the other along only one longitudinal edge, so as to be capable of being opened up into a film of double width. It will be understood from the description of the process given in connection with Figs. 8 through 11 that such an article is produced when the non-adhesive coating is applied to all portions of the first layer of film except a margin at one longitudinal edge of this layer. In case it is desired to produce a series of sheets integrally joined at alternate edges, as illustrated in Fig. 18, there may be applied to the second layer of film a non-adhesive substance, leaving the opposite longitudinal margin exposed. A third layer of film-forming substance is applied thereover, and the steps can be repeated to form any number of sheets integrally joined at alternate edges.

While a suitable method to be used in accordance with the invention has been described in some detail, and certain modifications have been suggested, it will be understood that numerous changes may be made without departing from the general principles and scope of the invention.

I claim:

1. The method of preparing a surface decorated, unitary, self-sustaining sheet of a flexible, readily extensible, resilient plastic which comprises forming from a freely flowing plastic batch material a dry solidified plastic sheet on an inextensible, flexible carrier sheet having free ends, said plastic sheet being in direct superficial contact with the surface of the carrier sheet, said surface being smooth and unfavorable to the formation of an interlocking bond with the plastic sheet, to which surface the plastic sheet coheres to provide a readily manipulable fissionable assemblage, processing the two coherent sheets by passing the same in assembled relation and in flexible condition to and from a decorating zone and while in said zone applying decorative material directly to the exposed surface of the plastic sheet while it is maintained against distortion of area by the thereto cohering carrier sheet, and thereafter stripping from the carrier sheet the decorated plastic sheet as a self-sustaining sheet.

2. The method of preparing a surface decorated, unitary, self-sustaining sheet of a flexible, readily extensible, resilient plastic which comprises forming from a freely flowing plastic batch material a dry solidified plastic sheet on an inextensible, flexible carrier sheet having free ends, said plastic sheet being in direct superficial contact with the surface of the carrier sheet, said surface being smooth and unfavorable to the formation of an interlocking bond with the plastic sheet, to which surface the plastic sheet coheres to provide a readily manipulable fissionable assemblage, processing the two coherent sheets by passing the same in assembled relation and in flexible condition to and from a decorating zone and while in said zone printing a design directly on the exposed face of the plastic sheet while the latter is maintained against distortion by the thereto cohering carrier sheet, and thereafter stripping from the carrier sheet the plastic sheet as a self-sustaining sheet.

3. The method of preparing a surface-decorated, unitary, self-sustaining film of flexible, readily extensible resilient plastic, which comprises forming from a freely flowing batch material comprising a resin, a plasticizer and a diluent, a film-forming layer on a coated surface of a free-ended flexible paper carrier, drying said layer with the aid of heat to drive out said diluent and form a dry film, said surface being smooth and unfavorable to the formation of an interlocking bond with said film, said film cohering with said surface to provide a readily manipulable fissionable assemblage, processing said carrier and said film cohering thereto by passing the same in assembled relation and in flexible condition to and from a printing zone and while in said zone printing a design directly on the exposed face of said film while said film is maintained against distortion of area by the thereto cohering carrier, and thereafter stripping said film from said carrier as a self-sustaining film.

4. The method of preparing a self-sustaining vinyl film bearing a printed design, which comprises forming from freely flowing plastic batch material including a vinyl resin, a film-forming layer on a coated surface of a flexible paper carrier having free ends, solidifying said layer while on said carried to form a dry film, said surface being smooth and unfavorable to the formation of an interlocking bond with said film, said film cohering with said surface to provide a readily manipulable fissionable assemblage, processing said carrier and said film cohering thereto by passing the same in assembled relation and in flexible condition to and from a printing zone and while in said zone printing a design directly from a roller onto the exposed face of said film while said film is maintained against distortion of area by the thereto cohering carrier, and thereafter stripping said film from said carrier as a self-sustaining film.

MARC A. CHAVANNES.

REFERENCES CITED

The following references are of record in the file of this patent:

UNITED STATES PATENTS

| Number | Name | Date |
|---|---|---|
| 2,036,377 | Wells | Apr. 7, 1936 |
| 2,082,486 | Frenkel | June 1, 1937 |
| 2,404,073 | Karfiol et al. | July 16, 1946 |

FOREIGN PATENTS

| Number | Country | Date |
|---|---|---|
| 500,298 | Great Britain | Feb. 7, 1939 |